United States Patent [19]

Kalinowski et al.

[11] 4,158,607

[45] Jun. 19, 1979

[54] ENZYMATIC PREPARATION FOR RIPENING OF MILK PROTEIN PRODUCTS

[75] Inventors: Leonard Kalinowski; Elżbieta Frackiewicz; Leonarda Janiszewska; Anna Pawlik; Danuta Kikolska, all of Warsaw; Jerzy Pisarek, Pruszków; Maria Szadkowska; Jadwiga Świtacz-Tomaszewska, both of Warsaw, all of Poland

[73] Assignee: Instytut Przemyslu Mleczarskiego, Warsaw, Poland

[21] Appl. No.: 839,507

[22] Filed: Oct. 4, 1977

[30] Foreign Application Priority Data

Oct. 19, 1976 [PL] Poland ................................ 193146

[51] Int. Cl.² .......................... C07G 7/02; A23C 19/02
[52] U.S. Cl. ...................................... 195/62; 195/111; 426/36

[58] Field of Search ........................... 195/62, 63, 111; 426/36, 42, 63

[56] References Cited

U.S. PATENT DOCUMENTS

| 3,295,991 | 1/1967 | Cort et al. ............................... 426/36 |
| 3,667,968 | 6/1972 | Kasik et al. ............................. 426/36 |
| 3,975,544 | 8/1976 | Kosikowski et al. ................... 426/35 |

*Primary Examiner*—Lionel M. Shapiro
*Attorney, Agent, or Firm*—Haseltine, Lake & Waters

[57] ABSTRACT

The complex enzymatic preparation is composed of the proteases of molds, of *Penicillium candidum* or *Penicillium roqueforti*, which do not form any bitter peptides, and of autolysates of lactic bacteria *Streptococcus lactis* or *Lactobacillus casei*. Adding this preparation to milk permits shortening by half the period of time required for ripening of cheeses. The product has a good taste and more plastic consistency.

2 Claims, No Drawings

ENZYMATIC PREPARATION FOR RIPENING OF MILK PROTEIN PRODUCTS

This invention relates to an enzymatic preparation for ripening of milk protein products and especially cottage cheese and rennet cheeses.

Enzymatic preparations and especially proteolytic ones obtained from substances of animal or microbiological origin are used for various foods and in the tanning industry as well as for detergents.

Till now no information has been published on obtaining enzymatic preparations which would be suitable for regulating the ripening process of cheeses and cottage cheeses. A number of experiments gave no positive results. Fungal protease of *Penicillium chrysogenum* gives to cheese a bitter taste and a strange untypical off-flavor.

The yeast autolysate obtained from the Torulopsis species of yeast only sporadically caused a slight shortening of the ripening period of cheeses and consequently it was not practically introduced into practice.

Another kind of liquid preparation, viz. hydrolyzed starter, obtained from accumulated lactic acid bacteria in skim-milk, whereby the bacteria were treated with pepsin and neutralized with soda has been found unsuitable for practical purposes due to its low proteolytic activity. The main reason for this resides in the lack of durability of this preparation and hence the impossibility of transporting it, so that it would have to be made directly in the cheese plant, which is too complicated in practical use. Moreover, this preparation causes a bitter taste in cheeses.

The most important reason for the unsuitability of the majority of the thus far manufactured enzymatic preparations for cheese ripening was their incorrect composition. In most cases these were proteolytic enzymes which caused non-specific changes in cheese, the said changes being different from those, occuring in the traditional ripening process. The said preparations did not include a number of other enzymes contributing to accumulation of the proper taste and flavor substances and suitable consistency of cheeses.

The enzymatic preparation according to this invention consists of purified and dried intra-cellular proteases which are produced by *Penicillium candidum* or *Penicillium roqueforti* molds mixed with dried enzymes extracted from lactic acid bacterial cells, the most advantageous being *Streptococcus lactis* or *Lactobacillus casei* in the proportion: 1 weight part of fungal dried protease with an activity of 5000 units per gram to 3 weight parts of dry enzymatic bacteria extract a with proteolytic activity of 70 units per gram of *Streptococcus lactis* or 140 units per gram of *Lactobacillus casei*.

The fungal protease is obtained by extracting the fungal biomass *Penicillium candidum* or Penicillium roqueforti homogenized with water.

The enzymatic extract of lactic acid bacteria is obtained from a cellular biomass of lactic acid bacteria. The cells are destroyed by autolysis or by means of ultrasounds. The extract is dried by the known lyophilization method.

A method of obtaining purified fungal protease which is a component of the complex preparation for cheese ripening is as follows: the fungal biomass of *Penicillium candidum* or *Penicillium roqueforti* is cultivated on a whey growth medium by using the surface or submerged method. After separation from the growth medium and washing, the fungal biomass is crushed of the homogenizer, preferably in a slot type. From the obtained suspension the protease is extracted by holding at a of pH value from 5.6 to 6.8 and a temperature from $+6°$ to $+10°$ C. for 18 to 24 hours. The structural cellular elements are separated from the suspension by separating at 4000 to 6000 g. The obtained extract is then purified by precipitation of the enzymes with ethyl alcohol at a final concentration of 70% or by salting out with ammonium sulfate with up to 75% of the ammonium sulfate by weight in the extract. The precipitated enzymes are then separated by centrifugation and dried by the lyophilization method.

The second component of preparation according to this invention, viz. bacteria enzymes are obtained from the selected strains of the lactic acid bacteria, preferably—from *Streptococcus lactis* or *Lactobacillus casei*. These strains are cultivated in a whey growth medium which is enriched with peptone and yeast extract or with the peptones which are obtained by a direct proteolysis of whey proteins with an enzyme, preferably with papain. The obtained biomass is then separated by centrifuging, afterwards subjected to autolysis and extraction in aqueous suspension during 72 hours at a temperature $+4°$ to $+8°$ C. or it is treated by destroying the cells by means of ultrasounds, whereafter the autolysate is dried by the known sublimation method.

For obtaining the complex enzymatic preparation the dry fungal protease is mixed with the dried enzymatic extract of lactic acid bacteria.

The complex enzymatic preparation shortens the process of cheese ripening by half without causing a bitter taste. The product has a good taste and more plastic consistency. However, depending on the composition it affects the taste properties, so that the preparation which is composed of *Penicillium candidium* protease and of the intracellular enzymes extracted from *Streptococcus lactis* causes a mild nut flavor being similar to that of Holland type cheeses, whereas the *Lactobacillus casei* extract contributes to a sharp taste. Thus by using the complex enzymatic preparations of various composition it is possible, in the same production process, to obtain various cheese types. This will be of special importance when the continuous method for production of is introduced.

EXAMPLE

A *Penicillium candidum* parent culture is cultivated in sterile closed vessels on a solid agar malt growth medium during a 3 weeks period at a temperature of 22° C. Spores are washed out with physiological saline solution and the suspension is used to inoculate sterilized whey at a pH of 4.5 poured as a thin layer (3 to 5 mm) on sterile plates cultivated for 8 days at 22° C. and a relative humidity of about 98%. The fungal surface scum is then taken out, washed with pasteurized tap water, ground to pieces (very small ones), mixed with distilled (sterile) water in the amount of 1 liter per 1 kg of the fungal micelle, then homogenized four times in a slot homogenizer under a pressure above 100 at. The crushed suspension of the fungal biomass is then brought to a pH of 5.6–6.0 and kept at a temperature from 6° to 10° C. for 18 to 24 hours; next the residues of the fungal mass are separated by centrifuging and the obtained solution is cooled down to about $+2°$ C., after which ethyl alcohol at minus 20° C. is slowly added to obtain a final concentration of 70%. This solution is then kept in cold storage at 2° to 6° C. till the protein floccules precipitate, whereafter the white protease sediment is separated by centrifuging. Traces of alcohol are removed by a stream of sterile cold air and the sediment is dried by sublimation.

The culture of the selected *Streptococcus lactis* strain is inoculated on a sterile whey medium enriched with 0.25% yeast extract and 0.25% peptone, then it is incubated at 30° C. for 24 hours. The thus obtained parental starter is added in an amount of 2% to enriched whey medium which is in a fermenter. After 12 to 18 hours incubation this starter is used to inoculate the whey medium in a starter tank. The starter addition amounts to 5%. The bacterial culture is maintained for 24 hours with continuous stirring and neutralized with a 10% sterile solution of soda lye to a pH of 6.5-5.5. The bacteria cells biomass is separated from the biomass medium by centrifuging and the sediment is washed out with a sterile solution of the phosphate buffer M/15 at a pH of 6.8 and separated again.

The bacteria cells in an amount of about 15% are suspended in distilled water, then the autolysis and extraction process is carried out by stirring the solution at a temperature of +4° to +8° C. for 24 hours. The autolysate is then lyophilized. The dried preparation is then powdered and used as a component of the complex enzymatic preparation.

To obtain the complex enzymatic preparation the proteolytic enzyme from *Penicilium candidum* having a proteolytic activity of 5000 units per gram is mixed with a dry enzymatic extract of the *Streptococcus lactis* bacteria having a proteolytic activity of 70 units per gram, using the weight proportion 1:3.

We claim:

1. An enzymatic preparation for ripening of milk protein products, consisting essentially of a mixture of purified intracellular fungal protease from *Penicillium candidum* and of proteolytic enzymes obtained by autolysis of lactic acid bacteria cells.

2. The enzymatic preparation as claimed in claim 1 consisting essentially of one part w/w of dry powdered fungal protease from *Penicillium candidum* with an activity of 5000 units per gram and three parts w/w of a dry proteolytic enzyme from lactic acid streptococci with a proteolytic activity of 70 units per gram or from lactic acid bacilli with a proteolytic activity of 140 units per gram.